(12) United States Patent
McColligan et al.

(10) Patent No.: US 7,077,029 B2
(45) Date of Patent: Jul. 18, 2006

(54) CYCLE HANDLEBARS AND ATTACHMENTS WITH ADJUSTABLE FOREARM PADS

(75) Inventors: Michael J. McColligan, Calabasas, CA (US); Chris Hageman, S. Glastonbury, CT (US); Jim Sener, S. Glastonbury, CT (US); David Mathieu, S. Glastonbury, CT (US)

(73) Assignee: Jas. D. Easton, Inc., Van Nuys, CA (US)

( * ) Notice: Subject to any disclaimer, the term of this patent is extended or adjusted under 35 U.S.C. 154(b) by 289 days.

(21) Appl. No.: 10/256,690

(22) Filed: Sep. 27, 2002

(65) Prior Publication Data

US 2004/0060382 A1    Apr. 1, 2004

(51) Int. Cl.
 B62K 21/12 (2006.01)
(52) U.S. Cl. .................................... 74/551.8
(58) Field of Classification Search .... 74/551.1–551.9; 280/288.4
See application file for complete search history.

(56) References Cited

U.S. PATENT DOCUMENTS

| | | | |
|---|---|---|---|
| 4,750,754 A | | 6/1988 | Lennon |
| 4,873,886 A | * | 10/1989 | Renner ...................... 74/551.8 |
| 4,878,397 A | | 11/1989 | Lennon |
| 5,000,469 A | * | 3/1991 | Smith ......................... 280/261 |
| 5,145,210 A | * | 9/1992 | Lennon .................... 280/281.1 |
| 5,154,094 A | * | 10/1992 | Klieber ....................... 74/551.1 |
| 5,163,339 A | * | 11/1992 | Giard et al. ................ 74/551.3 |
| 5,209,508 A | * | 5/1993 | Lennon ...................... 280/261 |
| 5,235,872 A | * | 8/1993 | Giard, Jr. ................... 74/551.8 |
| 5,319,994 A | * | 6/1994 | Miller ........................ 74/551.8 |
| 5,353,663 A | * | 10/1994 | Samuelson ................. 74/551.8 |
| 5,390,564 A | * | 2/1995 | Klieber ....................... 74/551.1 |
| 5,501,477 A | * | 3/1996 | Moreau .................... 280/281.1 |
| 5,503,773 A | * | 4/1996 | Pearce et al. ............. 264/328.1 |
| 5,737,967 A | * | 4/1998 | Hartley ...................... 74/551.3 |
| 6,092,438 A | * | 7/2000 | Soto ........................... 74/551.8 |

* cited by examiner

*Primary Examiner*—Chong H. Kim
(74) *Attorney, Agent, or Firm*—Roth & Goldman, P.A.

(57) ABSTRACT

A cycle handlebar is provided comprising a central cross piece, a pair of forearm pad supports extending from the cross piece, each of said pad supports having a length extending substantially parallel to the cross piece and a pair of laterally spaced steering arms extending generally forward from the cross piece. A steering arm and forearm rest assembly for a cycle handlebar is also provided, comprising: a handlebar stem, a pair of laterally spaced steering arms, and a pair of forearm pad supports each having a length to be positioned substantially parallel to and spaced from said cross piece. The steering arms and forearm pad supports have mating clamp parts forming first clamps for attaching a steering arm and pad support to each other and to the stem.

10 Claims, 4 Drawing Sheets

CYCLE HANDLEBARS AND ATTACHMENTS WITH ADJUSTABLE FOREARM PADS

CROSS REFERENCE TO RELATED APPLICATIONS, IF ANY

None

BACKGROUND OF THE INVENTION AND PRIOR ART

FIELD OF THE INVENTION

The present invention relates to handlebars and handlebar attachments for cycles, particularly lightweight bicycles for recreational riding, racing, or off-road uses.

Since reduction of weight is of extreme importance in human-powered cycles such as bicycles, increasing use has been made of lightweight tubular structures made entirely or primarily of composite materials where possible and practical instead of those primarily manufactured of aluminum or other metals.

SUMMARY OF THE INVENTION

A first embodiment of the invention provides a cycle handlebar comprising a central cross piece, a pair of forearm pad supports extending from said cross piece, each of said pad supports having a length extending substantially parallel to said cross piece and a pair of laterally spaced steering arms extending generally forward from said cross piece.

A second embodiment of the invention provides a steering arm and forearm rest assembly for a cycle handlebar, comprising: a handlebar stem to be positioned extending generally rearward from a cross piece of a handlebar to a steering tube, a pair of laterally spaced steering arms to be positioned extending generally forward from said cross piece, a pair of forearm pad supports each having a length to be positioned substantially parallel to and spaced from said cross piece, said steering arms and forearm pad supports having mating clamp parts forming first clamps for attaching a steering arm and pad support to each other and to said stem, and said stem including a second clamp for attaching said stem to said cross piece.

A third embodiment of the invention provides a steering arm and forearm rest unit for a cycle handlebar, comprising: a steering arm to be positioned extending generally forward from a cross piece of cycle handlebar, a clamp on said steering arm for clamping said steering arm to said cross piece, and a forearm pad support extending from said clamp, said forearm pad support having a length to be positioned substantially parallel to and spaced from said cross piece.

DESCRIPTION OF THE PREFERRED EMBODIMENTS

Figure 1:
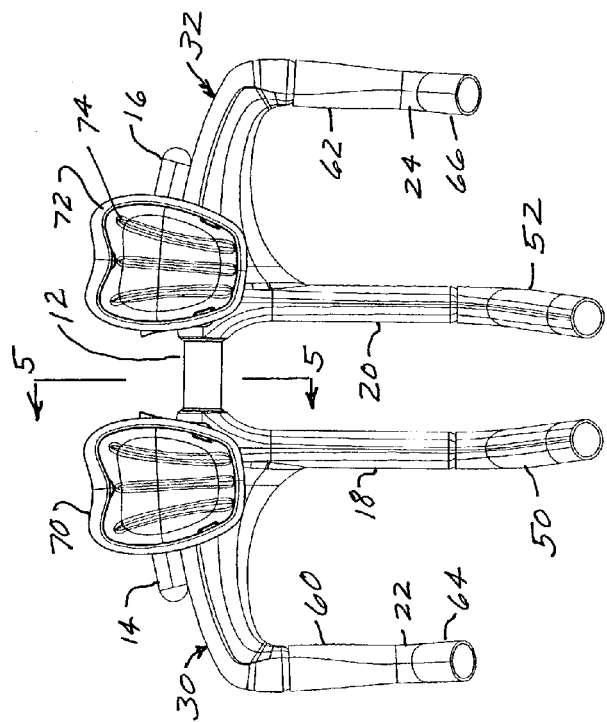
FIG. 1 is a perspective view of a multi-position one piece handlebar suitable for racing and Triathlon use comprising a first embodiment of the present invention.

As is well known, a cycle stem comprising a tube of desired length is used to connect the handlebar or handlebars of a bicycle or other type cycle to a generally vertically oriented steering tube which is in turn connected to a front wheel fork for steering the cycle. At the front end of the stem tube (as referred to herein, front, rear and sides refer to orientation as viewed when sitting on a bicycle) a front opening handlebar clamp is typically provided. Opposed stationary and moveable generally C-shaped clamp members define a handlebar receiving cavity therebetween which may be cylindrical, octagonal, hexagonal or of other suitable cross-section for receiving the central cross piece of a cycle handlebar.

FIGS. 1 through 6 comprise a first embodiment of the invention in the form of a handlebar 10 having a central cross piece 12, a pair of forearm pad supports 14, 16 each having a length which extends substantially parallel to the cross piece 12 and a pair of laterally spaced steering arms 18, 20 which extend generally forward from the cross piece 12.

The handlebar 10 may further include a second pair of steering arms 22, 24 spaced outwardly from the steering arms 18, 20 to provide respective inner and outer pairs of steering arms 18, 20; 22, 24.

The handlebar 10 may be fabricated into a single piece from three separate parts comprising the central cross piece 12 and two side pieces or wings 30, 32. Wing 30 has a generally C-shape configuration comprised of an inner steering arm 18, an outer steering arm 22, and an outer cross piece 34. Wing 32 comprises a mirror image of wing 30 and is also formed of an inner steering arm 20, an outer steering arm 24, and an outer cross piece 36. Preferably, each of the wings 30 and 32 is integrally formed of a composite material such as carbon fiber reinforced resin. The central cross piece 12 may be formed of aluminum or other suitable metal or, similar to the wings 30, 32, the central cross piece 12 can also be formed of composite material. Preferably, the central cross piece 12 has splined ends received in splined apertures in the wings 30, 32 to prevent relative rotation of the cross piece 12 and wings 30, 32.

Figure 6:
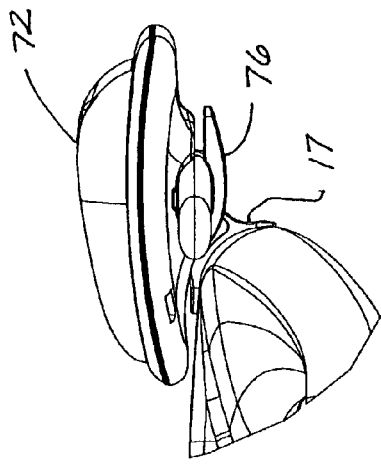
FIG. 6 is a left side elevation view showing a portion of FIG. 4 to an enlarged scale to depict one form of clamping a forearm pad to a forearm pad support.
Figure 5:
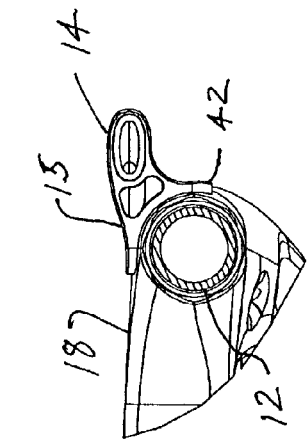
FIG. 5 is a vertical partial cross section taken through the central cross piece at line 5—5 in FIG. 2 showing one manner of attaching a forearm pad support to a wing.

The forearm pad supports 14, 16 are preferably formed as separate parts, each having a cradle 15 (one is shown in FIG. 6) at one end of shape complementary to the outer surface of the wing 30, 32 to which the support 14, 16 is attached. As seen in FIG. 6, the cradle 15 of the forearm pad support 14 may be fastened to the wing 30 by upper and lower fasteners 40, 42 such as screws or rivets. Alternatively, the forearm pad supports 14, 16 can be integrally formed with or bonded to the respective wings 30, 32.

Figure 2:
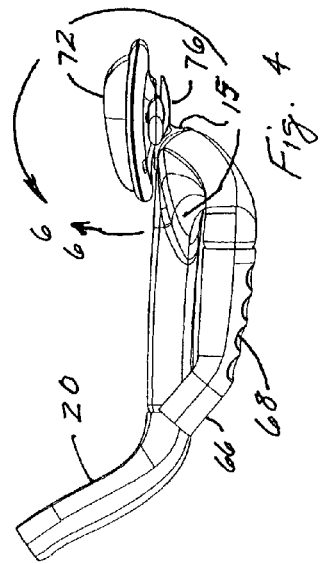
FIG. 2 is a top plan view of the handlebar shown in FIG. 1.
Figure 3:
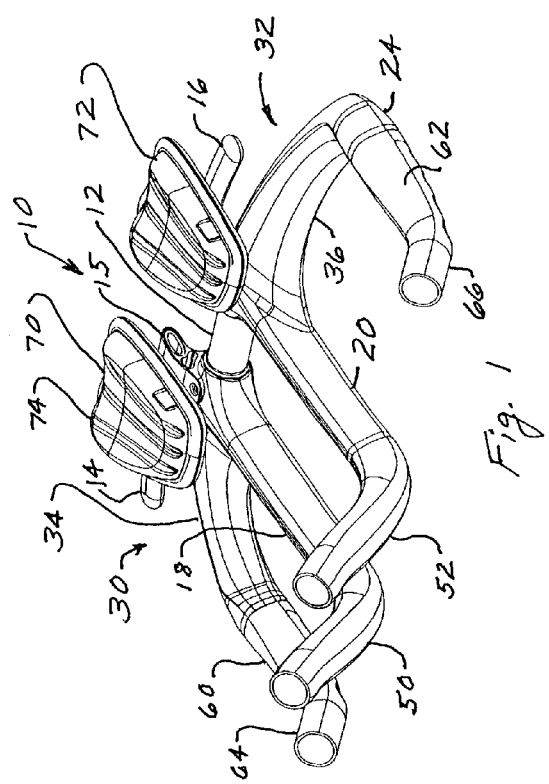
FIG. 3 is front elevation view of the handlebar shown in FIG. 1.

It will be noted from viewing FIG. 2 that the outer cross pieces 34, 36 of the wings 30, 32 are configured with forward concavity as are the lengths of the forearm pad supports 14, 16 which are generally parallel to and are spaced from the respective outer cross pieces 34, 36. This permits forearm pads 70, 72 (to be described) to be adjusted to the rider's sides along an arc to follow the natural motion of the rider's body. It will be noted further that the forearm pad supports 14, 16 extend in cantilever fashion from the wings 30, 32 since this provides vertical compliance minimizing transfer of road shock to the rider. Those skilled in the art will appreciate, however, that cantilever support of the pad supports 14, 16 is not essential, although preferred.

Steering handles 50, 52 are provided at the outer ends of the inner steering arms 18, 20 and handles 60, 62 are provided at the locations shown on the outer steering arms 22, 24. It will be noted that the inner handles 50, 52 extend further forward from the cross pieces 34, 36 than the outer handles 60, 62. Also, the steering handles 50, 52; 60, 62 may be ergonomically configured with finger grooves 68 and ergonomically configured cross sections rather than merely round cross sections. Slip on or wrap on grips of material chosen to optimize ergonomic feel may also be fitted to or molded over the handles 50, 52; 60, 62 as desired. It will be noted also from viewing FIGS. 2, 3 and 4 that the inner handles 50, 52 are forwardly and upwardly inclined and that they also converge inwardly. Similarly, the outer steering arms 22, 24 may include forwardly and upwardly inclined ends 64, 66 in front of the handles 60, 62 for comfort and to minimize slippage of the rider's hands forwardly of the handles 60, 62. The various angles of convergence and inclination of the handles and ends are selected for ergonomic comfort for riders of different sizes.

Figure 7:
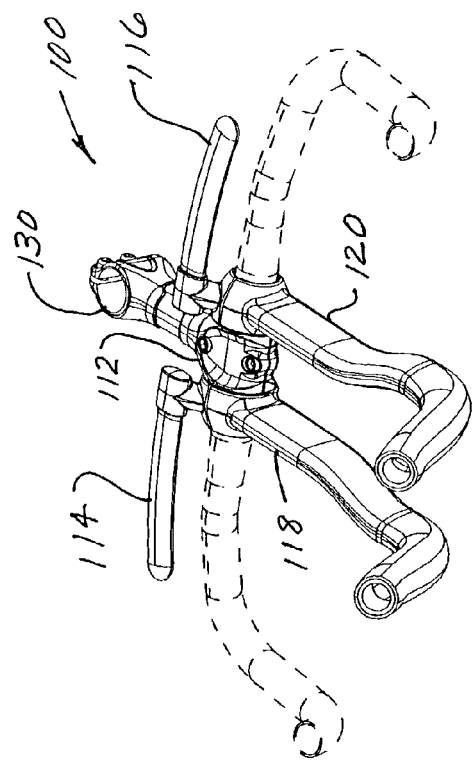
FIG. 7 is a perspective view of a modular assembly for attachment to a handlebar comprising a second embodiment of the present invention.
Figure 9:
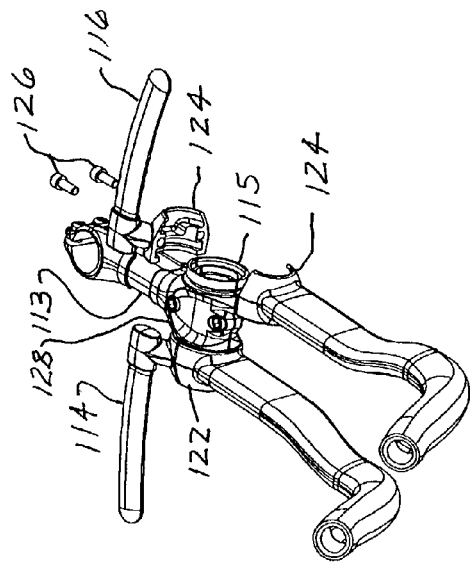
FIG. 9 is a perspective view like FIG. 7, but with the forearm pads removed and partially exploded like FIG. 8.

Forearm pads 70, 72 are adjustably affixed to the forearm pad supports 14, 16 at selected lateral positions along the lengths of the pad supports 14, 16 depending on the rider's size and desire. As seen in FIG. 7 which is drawn to an enlarged scale, forearm pad 72 includes a clamp preferably in the form of an attached flexible strap 76 having an aperture in its free end so that the strap 76 may be affixed by screw 80 to the underside of the forearm pad 72 to clamp the pad 72 to the forearm pad support 16. Forearm pad 70 is configured like pad 72 and is attached in similar fashion to the forearm pad support 14.

Figure 4:
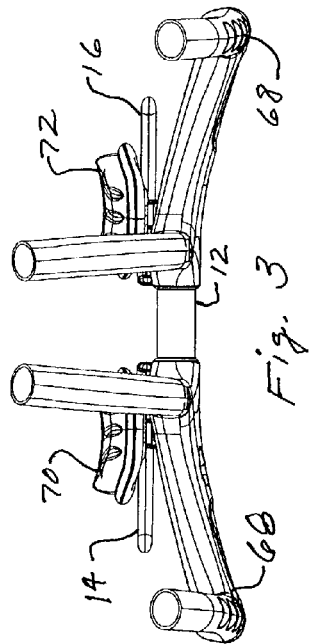
FIG. 4 is a side elevation view of the handlebar shown in FIG. 1.

Each of the forearm pads 70, 72, is preferably provided with one or more grooves 74 on its upper surface which extend generally in a fore and aft direction to provide air flow between the forearm of the rider and the pad 72, 74. The underside of each pad 70, 72 is preferably formed with a transversely extending groove of shape and size complementary to the upper surface of the forearm pad supports 14, 16 which are preferably of oval shape or other non-round shape as best seen in FIGS. 1 and 4. This configuration prevents rotation of the forearm pads 70, 72 around the forearm pad supports 14, 16. Preferably also, the forearm pads 70, 72 are fabricated in upper and lower pieces made of plastic or other lightweight material which may be snapped and screwed together to mechanically enclose foam pads to better cushion the rider's forearms, ease and replacement and positively secure the pads 70, 72 during use and transportation. It will be noted that the forearm pad clamp screws 80 are easily accessible from below the pads 70, 72 to permit fast adjustment of the positions of the forearm pads 70, 72 along the lengths of the forearm pad supports 14, 16. The central cross piece 12 has a length between the wings 30, 32 adequate to permit front loading of the handlebar 10 into a conventional front loading stem. The rider can then adjust the handlebar height and reach (fore and aft position) with a choice of stem length.

FIGS. 7 through 11 depict a second embodiment of the invention comprising a modular assembly 100 attachable to an existing bicycle handlebar. The assembly 100 comprises a steering arm and forearm rest assembly which includes (1) a front loading handlebar stem 112, (2) a pair of laterally spaced steering arms 118, 120, attachable to the stem and positionable to extend generally forward from the stem 112 and a cross piece of a cycle handlebar, shown in phantom, onto which the modular assembly 100 may be mounted, and (3) forearm pad supports 114, 116 attached to the stem 112 and to the steering arms 118, 120. The forearm pad supports 114, 116 each have a length to be positioned substantially parallel to and spaced from the cross piece of the cycle handlebar. Similar to the embodiment of the invention shown in FIGS. 1 through 6, the forearm pad supports 114, 116 are arcuately curved with forward concavity and are supported by the clamps 122, 124 in cantilever fashion. A pair of clamps 122, 124 best seen in FIGS. 8–10 affix the pad supports 114, 116 and the steering arms 118, 120 to each other and to the stem 112. The steering arms 118, 120 may be bonded to or mechanically attached to one of relatively moveable parts of the clamps 122, 124 or the arms 118, 120 may be formed together with the clamp parts as one integral piece. Clamps 122, 124 comprise generally C-shaped clamps having a split between relatively moveable parts on the forearm pad supports and on the steering arms 118, 120 which extends along a generally vertical plane. The clamp parts on the pad supports 114, 116 and the steering arms 118, 120 are affixed together with generally horizontally extending fasteners such as clamp screws 126 to clamp the pad supports 114, 116 and steering arms 118, 120 together and to grip onto the periphery of one of two spaced flanges 115 (only one is shown) on the stem 112.

Figure 11:
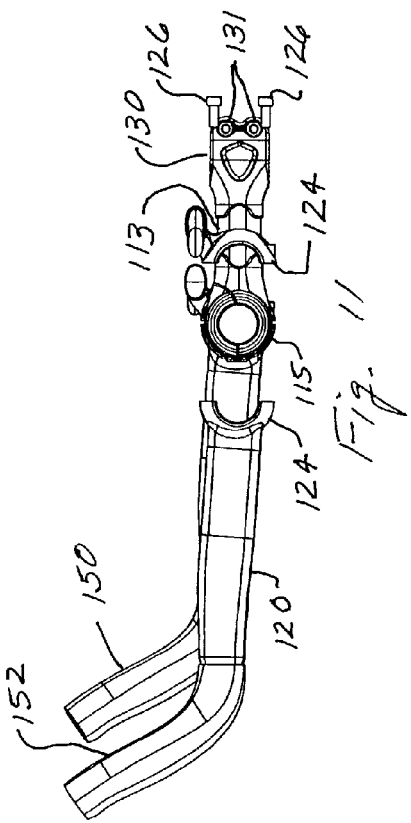
FIG. 11 is a side elevation view of the assembly shown in FIG. 8.
Figure 8:
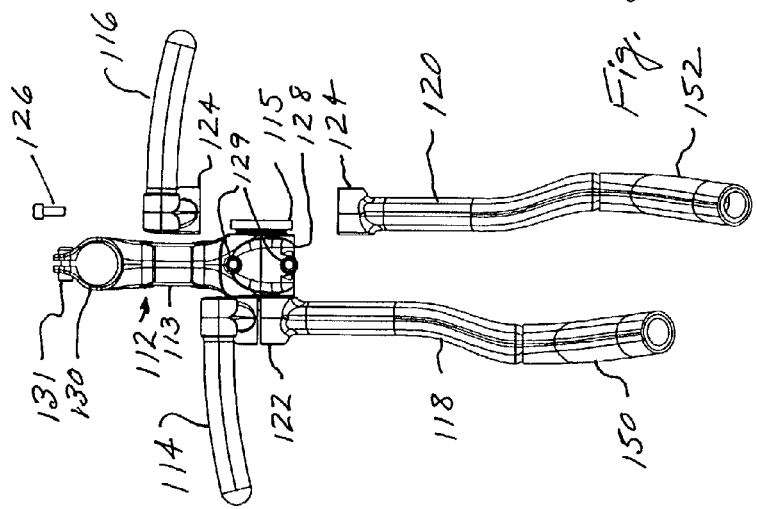
FIG. 8 is a top plan view of the assembly shown in FIG. 7, partially exploded at one side.
Figure 10:
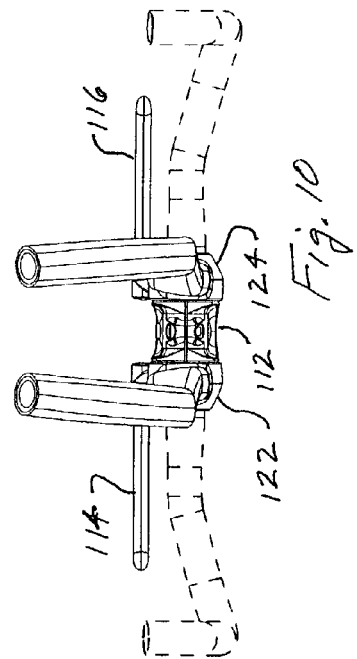
FIG. 10 is front elevation view of the assembly shown in FIG. 7.
Figure 12:
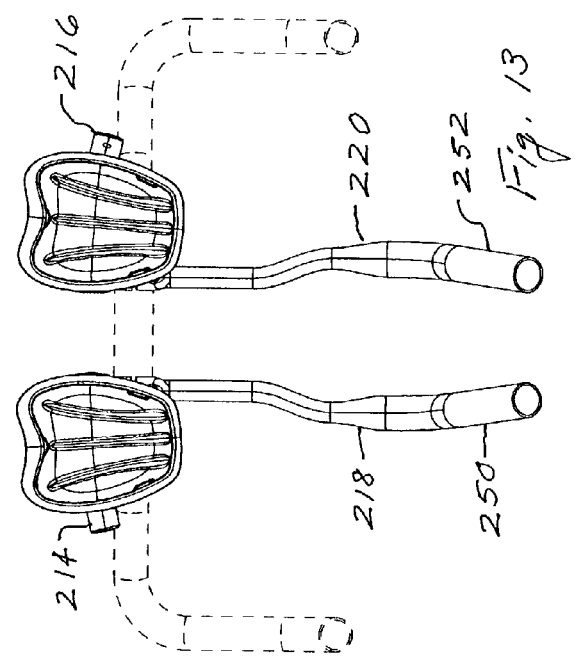
FIG. 12 is a perspective view of a pair of units for clamping onto the cross piece of a handlebar comprising a third embodiment of the present invention.
Figure 13:
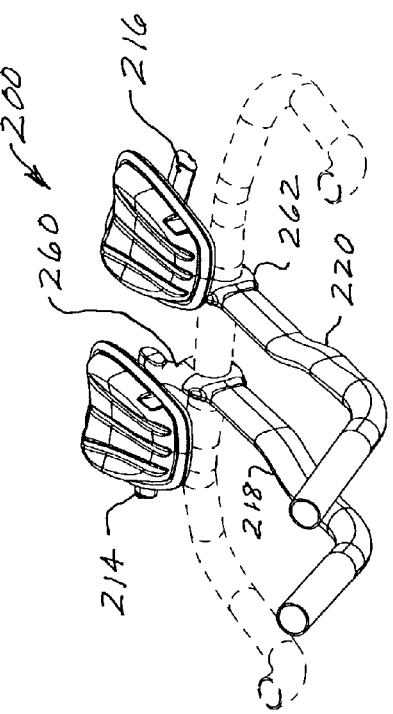
FIG. 13 is a top plan view of the embodiment shown in FIG. 12.
Figure 15:
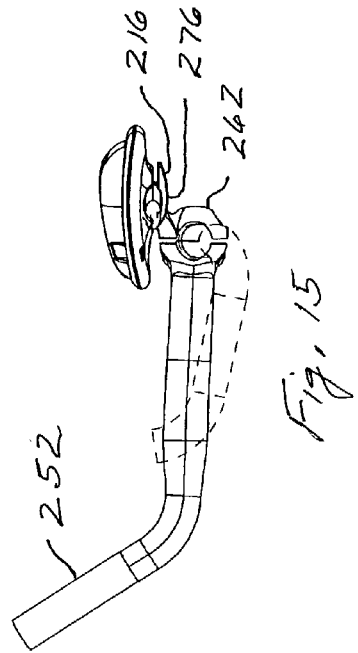
FIG. 15 is a side elevation view of the embodiment shown in FIG. 12.
Figure 14:
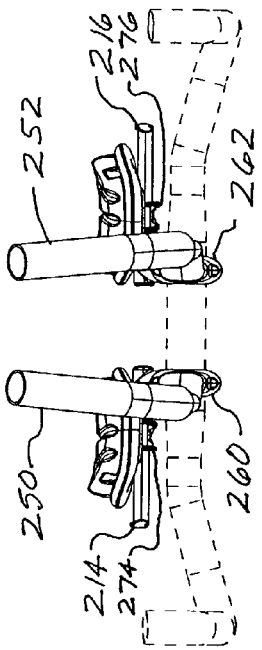
FIG. 14 is a front elevation view of the embodiment shown in FIG. 12.

The stem 112 includes a tubular boom 113 preferably fabricated of carbon reinforced composite. The front end of the composite boom 113 is slipped into a front loading handlebar clamp 128, preferably fabricated of high strength aluminum alloy, having a generally horizontally extending split used with substantially vertically extending fasteners 129 preferably accessible from below the clamp 128 to clamp the forward end of the stem 112 to a cycle handlebar. The rear end of the composite boom 113 is slipped into a steering tube clamp 130, also preferably fabricated of high strength aluminum alloy. The steering tube clamp 130 also has a vertical split and horizontally extending clamping screws 131 as best seen in FIGS. 8 and 11. This construction of the stem 112 comprising a composite boom 113 preferably slid into the metal clamps 128, 130 (rather than the clamps having projecting ends which slide into the boom 113) allows the use of adhesive such as epoxy to provide bond joints on the exterior of the boom 113.

The manner of attachment of the forearm pads 170, 172 to the respective pad supports 114, 116 is also the same as that described with reference to the embodiment illustrated in FIGS. 1 through 6 as is the preferred configuration of the pads 170, 172 with air circulation grooves 174 on the upper surface and the non-circular cross section of the forearm pad supports 114, 116 which, with suitably configured forearm pad clamps such as straps 176 and fasteners like those shown in FIG. 6, prevent rotation of the pads 170, 172 around the forearm pad supports 114, 116. Also, like the embodiment shown in FIGS. 1–6, the steering arms 118, 120 include handles 150, 152 which may be forwardly and upwardly inclined and which may converge inwardly. The forearm pad supports 114, 116, clamps 122, 124, and steering arms 118, 120 may all be formed of composite material such as lightweight carbon fiber reinforced resin or of lightweight metal such as high strength aluminum.

It will be noted that the steering arms 118, 120 may be readily removed from the stem 112 as desired. Cosmetic rings (not shown) may be provided to cover the exposed flanges 115 on the stem when the steering arms 118, 120 are removed. The fasteners 129 which affix the stem 112 to the handlebar are preferably accessible from below thereby enabling the clamps 122, 124 to have a smooth upper surface. Alternatively, these and all other fasteners mentioned herein may be seated in countersunk holes to avoid protrusion of the fastener heads above surfaces which should remain smooth for rider comfort and safety. Preferably, the steering arm clamps 122, 124 have their split along a first plane which intersects the plane of the split of the handlebar clamp 129 at an angle in the range of about 80°–110°. The first plane is usually substantially vertical and the second plane is substantially horizontal when the assembly 100 is affixed to a handlebar.

The third embodiment of the invention shown in FIGS. 11–15 will now be described. This embodiment comprises a steering arm and forearm pad unit (mirror image left hand and right hand units which may be are clamped onto a cross piece of a cycle handlebar at laterally spaced positions). Each unit includes a steering arm 218, 222, to be positioned extending generally forward from a cross piece of a cycle handlebar, a rear opening clamp 260, 262 on the steering arm 218, 220, for clamping the steering arm to the cross piece, and a forearm pad support 214, 216 extending from the clamp 260, 262. As in the previously described first and second embodiments of the invention, the forearm pad supports 214, 216 have a length to be positioned substantially parallel to and spaced from the cross piece of the cycle handlebar and the forearm pad supports 214, 216 each have a length configured with forward concavity. The clamps 260, 262 each have a split extending in a generally vertical plane (when the clamps are affixed to a handlebar cross piece) and generally horizontally extending fasteners accessible from the rear sides of the clamps 260, 262 for joining the clamp parts together. Preferably, the steering arms 218, 220 and the clamps 260, 262 are formed of a high strength aluminum alloy and welded or bonded to each other. Alternatively, the steering arms 218, 220 and clamps 260, 262 can be formed in one piece. A redundant mechanical fastener (not shown) may be provided to give the rider tactile feedback in the event of failure of the weld joint connecting the steering arms 218, 220, with the respective clamps 260, 262. The pad support arms 214, 216 are also welded or bonded to the clamps 260, 262 and another redundant mechanical fastener (not shown) may also be provided to provide the rider with tactile feedback if failure of the weld connection between the pad supports 214, 216 and the clamps 260, 262 has occurred. The pads 270, 272 are preferably fabricated and affixed to the pad supports 214, 216 in the manner previously described above with reference to the first and second embodiments of the invention. All fasteners are accessible when the two units 200, 202 are mounted on the handlebar of a bicycle allowing easy set up and adjustment while on the road.

Persons skilled in the art will readily appreciate that various modifications can be made from the preferred embodiment thus the scope of protection is intended to be defined only by the limitations of the appended claims.

The invention claimed is:

1. A steering arm and forearm rest assembly for a cycle handlebar, comprising: a handlebar stem to be positioned extending generally rearward from a cross piece of a handlebar to a steering tube, a pair of laterally spaced steering arms to be positioned extending generally forward from said cross piece, a pair of forearm pad supports each having a length to be positioned substantially parallel to and spaced from said cross piece, said steering arms and forearm pad supports having mating clamp parts forming first clamps for attaching a steering arm and pad support to each other and to said stem, and said stem including a second clamp for attaching said stem to said cross piece.

2. The assembly of claim 1, wherein said forearm pad supports are configured with forward concavity.

3. The assembly of claim 1, wherein said forearm pad supports are cantilevered from said stem.

4. The assembly of claim 1, further comprising forearm pads affixed to each of said forearm pad supports.

5. The assembly of claim 4, wherein said forearm pad supports have a non-circular cross section and said forearm pads include clamps affixed to said pad supports at desired positions along said lengths.

6. The assembly of claim 1, wherein said steering arms include forwardly and upwardly inclined handles.

7. The assembly of claim 6, wherein said inner handles forwardly converge inwardly and upwardly.

8. The assembly of claim 1, wherein said stem, said forearm pad supports and said steering arms are integrally formed of composite material.

9. The assembly of claim 1, wherein said first clamps have a split along a first plane and said second clamp has a split along a second plane, said second plane intersecting said first plane at an angle in the range of 80°–110°.

10. The assembly of claim 9, wherein said stem includes spaced flanges and said first clamps affix said steering arms and pad supports onto said flanges.

* * * * *